United States Patent [19]

Gianino

[11] Patent Number: 5,322,349
[45] Date of Patent: Jun. 21, 1994

[54] SEAT BELT CUSHION APPARATUS

[76] Inventor: Peggy R. Gianino, 1321 SE. Van Loon Ter., Cape Coral, Fla. 33990

[21] Appl. No.: 958,808

[22] Filed: Oct. 9, 1992

[51] Int. Cl.⁵ .............................................. B60R 21/00
[52] U.S. Cl. ............................... 297/482; 297/DIG. 6
[58] Field of Search .......................................... 297/482

[56] References Cited

U.S. PATENT DOCUMENTS

| | | | |
|---|---|---|---|
| 3,306,662 | 2/1967 | Finnigan | 297/482 |
| 4,057,181 | 11/1977 | Finnigan | 297/483 X |
| 4,795,190 | 1/1989 | Weightman | 297/482 X |
| 4,886,318 | 12/1989 | Penasch | 297/482 |

Primary Examiner—Peter R. Brown
Attorney, Agent, or Firm—William E. Noonan

[57] ABSTRACT

A seat belt cushion apparatus with removable padding is disclosed. The apparatus includes an envelope having an elongate case with an interior compartment formed therein and a flap carried by the case for selectively opening and closing the compartment. A distal portion of the flap is releasably fastened to the case to retain the flap in a closed condition. Padding is removably received by the compartment when the flap is open. The case is generally aligned with and engaged with the seat belt on a side of the seat belt that generally faces the user of the belt and the flap is wrapped about the opposite side of the seat belt and fastened closed to secure the apparatus to the seat belt.

8 Claims, 2 Drawing Sheets

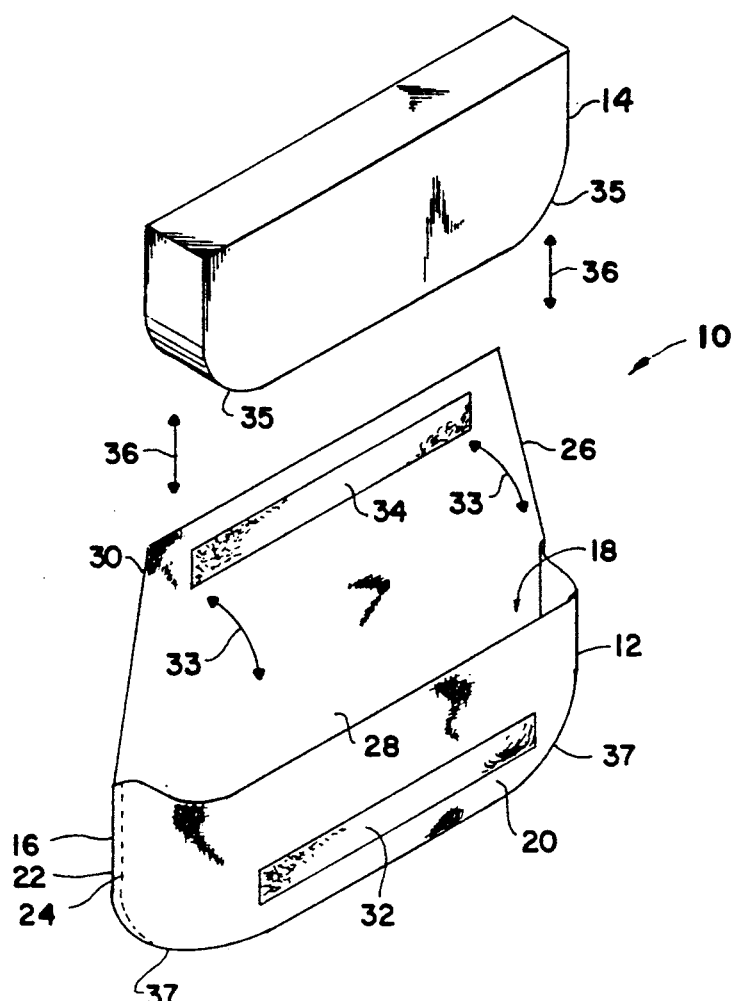
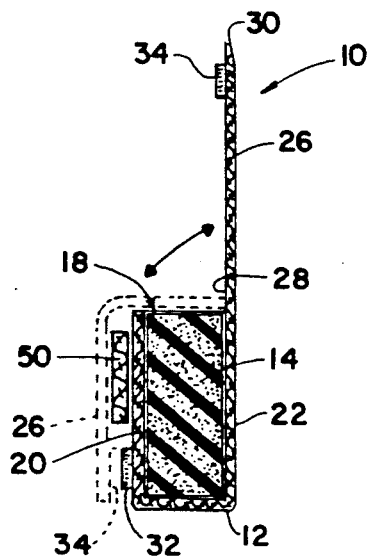
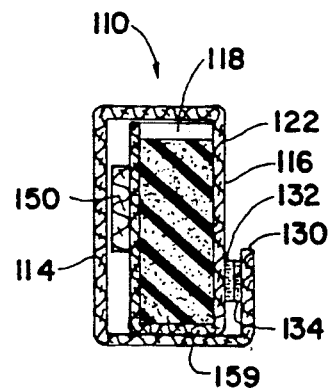

SEAT BELT CUSHION APPARATUS

FIELD OF THE INVENTION

This invention relates to a seat belt cushion apparatus with removable padding, which may be utilized by both children and adults in automotive vehicles, airplanes and the like.

BACKGROUND OF THE INVENTION

As seat belt use in automobiles and airplanes has increased in recent years, a variety of cushioned seat belt covers have been developed. Typically, these products are designed to make the seat belt more comfortable for the wearer and to protect the wearer and his or her clothing against soil carried by the seat belt. Such seat belt cushions are particularly advantageous for use by small children, who find unpadded seat belts especially uncomfortable.

Unfortunately, conventional seat belt cushions employ a fairly intricate construction, which requires time consuming and expensive manufacturing steps. Moreover, the padding in known seat belt cushions is permanently encased in a fabric or fur cover. The sealed padding material cannot be removed for washing or cleaning and when the padding has lost its resilience or otherwise deteriorated, it cannot be replaced. Rather, the entire seat belt cover must be discarded and an entirely new product must be purchased. This is wasteful because quite often the decorative exterior case or cover remains functional even after the cushion has worn out.

SUMMARY OF INVENTION

It is therefore an object of this invention to provide a seat belt cushion apparatus that permits the padding or cushioning material to be selectively removed for cleaning or replacement.

It is a further object of this invention to provide a seat belt cushion apparatus wherein a permanent cover holds a replaceable and washable pad securely therein during use of the product.

It is a further object of this invention to provide a seat belt cushion apparatus, which employs a rugged aesthetically pleasing cover that may be used even after the pad requires replacement.

It is a further object of this invention to provide a seat belt cushion apparatus that permits the amount of padding to be adjusted as needed or desired.

It is a further object of this invention to provide a seat belt cushion apparatus that may utilize various lengths and thicknesses.

It is a further object of this invention to provide a seat belt cushion apparatus that is suitable for use by both children and adults in various automotive vehicles, airplanes and other forms of transportation utilizing seat belts.

This invention results from a realization that an improved, simplified seat belt cushion with removable padding may be achieved by employing a exterior cover flap that serves both as a closure for accessing replaceable padding held in the cushion and as a means for attaching the cushion to the seat belt. More particularly, this invention features a seat belt cushion with removable padding, including an envelope that has an elongate case with an interior compartment formed therein and a flap carried by the case for selectively opening and closing the compartment. There are means for releasably fastening a distal portion of the flap to the case to retain the flap in a closed condition. Padding means are removably receivable by the compartment when the flap is in an open condition. The case is generally aligned and engaged with the seat belt on a side of the seat belt that generally faces the user of the seat belt and the flap is wrapped about the opposite side of the seat belt and fastened closed to secure the apparatus to the seat belt.

In a preferred embodiment, the flap is permanently secured along a proximal portion thereof to an upper region of the case adjacent an entrance into the compartment. The means for releasably fastening may include complementary hook and loop fastening elements carried respectively by an outer surface of the case and an inner surface of the distal portion of the flap. The case may include forward and rearward walls and the flap may be carried by the rearward wall. In such embodiments, the means for releasably fastening may include a first hook and loop fastening element carried by the forward wall of the case and a second complementary hook and loop fastening element carried by the distal portion of the flap. Alternatively, the first hook and loop element may be carried by the rearward wall of the case.

The padding means may include a resilient material such as a resilient foam. Preferably, the case is formed from a thin, lightweight and flexible material.

DETAILED DESCRIPTION OF PREFERRED EMBODIMENTS

Other objects, features and advantages will occur from the following description of preferred embodiments and the accompanying drawings, in which:

FIG. 1 is a perspective view of the seat belt cushion apparatus of this invention, with the padding removed from the case;

FIG. 2 is a side elevational, cross sectional view depicting the seat belt cushion apparatus with the padding received within the case and further illustrating operation of the flap;

Figure 3:
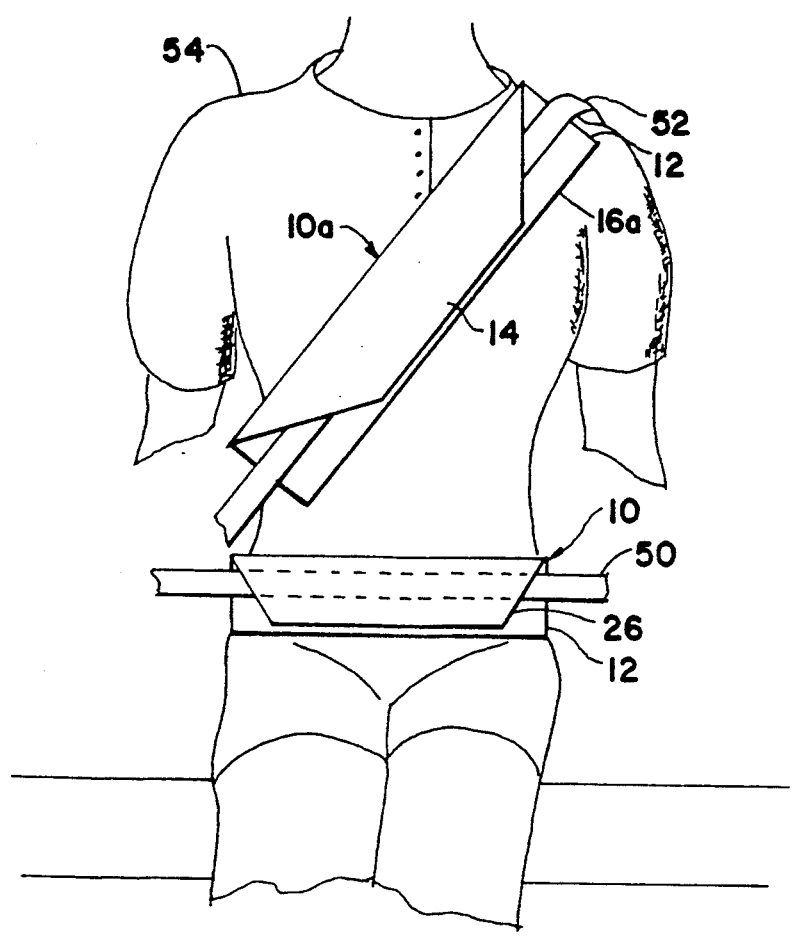

FIG. 3 is an elevational front view of a pair of seat belt cushion apparatuses, in accordance with this invention, being utilized respectively on lap and shoulder belts employed by a passenger in an automotive vehicle; and FIG. 4 is a side elevational, cross sectional view of an alternative seat belt cushion apparatus according to this invention, wherein the flap is fastened to a rearward wall of the case.

A seat belt cushion apparatus with removable padding, according to this invention, may be manufactured by fabricating an envelope that includes an elongate case having an interior compartment formed therein and a flap carried by the case for selectively opening and closing the compartment. The flap is preferably integrally secured along a proximal portion thereof to an upper region of the case, which is adjacent an entrance into the compartment. Typically, the entire envelope is composed from a single piece of thin, lightweight and flexible material such as an appropriate cloth fabric. The case and attached flap are formed by one of any number of known fabricating techniques, such as sewing or the like. In alternative embodiments, the case and flap may be composed of a suitable plastic which may be molded, sewn or otherwise formed to include the required components.

A distal portion of the flap is releasably fastened to an exterior surface of the case. This is accomplished by appropriate fastening means such as hook and loop (Velcro) fastening elements. Various other types of button or snap fasteners may be utilized. However, Velcro is likely the most appropriate means for providing a quick and secure, but releasable attachment.

A suitable padding element is removably received within the compartment. The padding element may include various types of resilient substances such as a resilient foam. This element may comprise one or multiple pieces and is preferably washable so that it may be periodically removed from the envelope and cleaned.

The envelope itself may carry various types of attractive designs. Preferably, the envelope should also be washable to remove dirt that is picked up from the vehicle and seat belt.

The dual function of the flap construction is a significant advantage of this invention. The flap not only serves to open and close the compartment, it also permits the apparatus to releasably engage the seat belt. After positioning the padded case between the seat belt and the body, the user wraps the flap about the belt and secures it closed against the case. The cushion apparatus may then be conveniently and comfortably positioned against the user and quickly and conveniently removed from the seat belt when required.

The removability of the padding is a further significant feature of this invention, which yields advantageous results. In particular, the padding may be removed so that it can be periodically cleaned or, when needed, entirely replaced. The envelope therefore constitutes a separate element that can still be used even after the padding deteriorates and requires replacement. Moreover, the removability of the padding permits the amount, width and thickness of the padding to be adjusted as required by the person using the seat belt. Accordingly, the apparatus of this invention may be adapted for use by adults or children. In a similar manner, the length and width of the apparatus may be varied within the scope of this invention to accommodate persons of various sizes.

There is shown in FIG. 1 a seat belt cushion apparatus 10 that includes a flexible fabric envelope 12 and a removable foam pad 14. Envelope 12 comprises an elongate case 16 having an interior compartment 18 (best shown in FIG. 2). More particularly, as illustrated in FIGS. 1 and 2, case 16 has a forward wall 20 and a rearward wall 22 that are joined together by means such as stitching 24. The upper regions of forward and rearward walls 20 and 22 define the entrance into compartment 18.

A closure flap 26 is secured integrally to and extends upwardly from the upper region of rearward wall 22. The relatively wide proximal portion 28 of flap 26 extends for generally the entire length of the entrance to compartment 18. From portion 28, the flap tapers to distal portion 30. Flap 26 is selectively raised and lowered as indicated by double-headed arrows 33 to open and close compartment 18.

Means are provided for releasably fastening distal flap portion 30 of flap 26 to case 16. Such means include a first hook and loop fastening element 32 that is secured adhesively or otherwise to the exterior surface of front case portion 20 and a second complementary hook and loop fastening element 34 that is similarly secured to the inside surface of distal flap portion 30.

Resilient foam element 14 includes a shape that generally corresponds to the interior shape of compartment 18. In particular, element 14 and compartment 18 include complementary curved lower corners 35 and 37, respectively. Padding element 14 is selectively introduced into and removed from compartment 18 in the direction of double-headed arrows 36, FIG. 1. When installed, the padding element 14 fits snugly and securely in compartment 18, as illustrated in FIG. 2.

Apparatus 10 is attached to and used in conjunction with a seat belt in the manner shown in FIGS. 2 and 3. In particular, FIG. 2 illustrates apparatus 10 engaged with a lap belt 50. FIG. 3 likewise discloses apparatus 10 engaged with lap belt 50, and further depicts an analogous seat belt cushion apparatus 10a that is engaged with shoulder belt 52. To engage the cushion apparatus with the seat belt, flap 26 is raised into the open condition shown in FIG. 2. Case 12 is then interposed between belt 50 and the wearer 54, FIG. 3, such that forward wall 20 engages seat belt 50 and rearward wall 22 engages wearer 54. Flap 26 is then lowered to close compartment 18 and wrapped about seat belt 50, as shown in phantom in FIG. 2. Fastening element 34 is engaged with complementary fastening element 32 to secure distal flap portion 30 to the outside surface of forward wall 20. As a result, the entire cushion apparatus 10 is secured to seat belt 50 and the wearer's abdomen is cushioned in the manner best shown in FIG. 3. Apparatus 10 may be slid and adjusted along belt 50 to achieve the most comfortable position for the wearer.

Apparatus 10 may be left on belt 50 between uses. Alternatively, the cushion may be removed from the seat belt by disengaging fastening elements 32 and 34 and raising flap 26. When required padding element 14 may be removed from case 12 for washing or replacement.

Cushion apparatus 10a is constructed analogously to apparatus 10 and operates to engage shoulder belt 52 in a manner similar to that described for apparatus 10 and its lap belt 50. Apparatus 10a is simply made somewhat longer than apparatus 10 to comfortably cushion the wearer against diagonally disposed shoulder belt 52. Again, the padded case 16a is interposed between belt 52 and wearer 54. Flap 14a wraps about belt 52 and detachably engages case 16a on the forward wall thereof. Hook and loop fastening elements or similar attachment means are used.

In the alternative cushion apparatus 110, illustrated in FIG. 4, the fastening elements are positioned somewhat differently than in the previously described embodiment. In particular, a first hook and loop element 132 is formed on the rearward wall 122 of case 116. Flap 114 is attached to wall 122 in a manner similar to that described above. However, flap 114 is somewhat longer than the previously described flap 14. As a result, when flap 114 is lowered to enclose compartment 118, it wraps about the seat belt 150 and about the bottom surface 159 of case 116. Distal portion 130 of flap 114 tucks between rearward wall 122 and the wearer such that the hook and loop fastening element 134 that is carried by distal flap portion 130 releasably engages the fastening element 132 carried by rearward wall 122. The flap is thus wrapped farther about the case 116 than in the previous embodiment. This provides a somewhat firmer attachment to the seat belt than is achieved in the embodiment of FIGS. 1-3. Otherwise apparatus 110 is constructed and operates analogously to the previously described embodiment.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A seat belt cushion apparatus with removable padding comprising:
    an envelope including an elongate case having an interior compartment formed therein and a flap carried by said case for selectively opening and closing said compartment, said case having forward and rearward walls, each said wall having first and second longitudinal edges and a pair of ends that interconnect said edges, said forward and rearward walls being sealed together along respective said ends and along respective said first side edges, and being separated along said second side edges to define an opening into said compartment, said flap being attached to said rearward wall proximate said second side edge and extending across said opening and overlapping an outer surface of said forward wall;
    means for releasably fastening a distal portion of said flap to said outer surface of said forward wall of said case to retain said flap in a closed condition; and
    padding means including an elongate piece of resilient foam that is shaped to generally conform to the shape of said compartment and removably receivable by said compartment when said flap is in an open condition
    whereby said case is generally aligned and engaged with the seat belt on a side of the seat belt that generally faces the user of the seat belt and said flap is wrapped about the opposite side of the seat belt and fastened closed to hold the seat belt between said flap and said outer surface of said forward wall and secure said apparatus to the seat belt.

2. The apparatus of claim 1 in which said flap is integrally secured along a proximal portion thereof to an upper region of said case adjacent an entrance into said compartment.

3. The apparatus of claim 1 in which said means for releasably fastening include complementary hook and loop fastening elements carried respectively by an outer surface of said case and an inner surface of said distal portion of said flap.

4. The apparatus of claim 1 in which said padding means include a resilient material.

5. The apparatus of claim 1 in which said case includes forward and rearward walls and in which said flap is carried by said rearward wall.

6. The apparatus of claim 5 in which said means for releasably fastening include a first hook and loop fastening element carried by said forward wall of said case and a second complementary hook and loop fastening element carried by said distal portion of said flap.

7. The apparatus of claim 5 in which said means for releasably fastening include a first hook and loop fastening element carried by said rearward wall of said case and a second complementary hook and loop fastening element carried by said distal portion of said flap.

8. A seat belt cushion apparatus with removable padding comprising:
    an envelope formed of a thin, lightweight and flexible material and including an elongate case having an interior compartment formed therein and a flap permanently secured along a proximal portion thereof to an upper region of said case adjacent an entrance into said compartment, for selectively opening and closing said compartment, said case having forward and rearward walls, each said wall having first and second longitudinal edges and a pair of ends that interconnect said edges, said forward and rearward walls being sealed together along respective said ends and along respective said first side edges, and being separated along said second side edges to define an opening into said compartment, said flap being attached to said rearward wall proximate said second side edge and extending across said opening and overlapping an outer surface of said forward wall;
    complementary hook and loop fastening elements, one of which is carried by an outer surface of said case and the other of which is carried by an inner surface of a distal portion of said flap for releasably interengaging to fasten said flap in a closed condition; and
    a resilient padding element that is removably receivable by said compartment when said flap is in an open condition;
    whereby said case is generally aligned and engaged with the seat belt on a side of the seat belt that generally faces the user of the seat belt and said flap is wrapped about the opposite side of the seat belt and fastened closed to secure said apparatus to the seat belt.

* * * * *